(12) United States Patent
Baur et al.

(10) Patent No.: US 11,556,273 B2
(45) Date of Patent: Jan. 17, 2023

(54) METHOD AND UNIT OF OPERATING A STORAGE MEANS, STORAGE MEANS AND SYSTEM FOR DATA PROCESSING

(71) Applicant: Technische Universität München, Munich (DE)

(72) Inventors: Sebastian Baur, Schrobenhausen (DE); Holger Boche, Berlin (DE); Christian Deppe, Bielefeld (DE)

(73) Assignee: Technische Universität, Munich (DE)

( * ) Notice: Subject to any disclaimer, the term of this patent is extended or adjusted under 35 U.S.C. 154(b) by 0 days.

(21) Appl. No.: 17/252,971

(22) PCT Filed: Jun. 19, 2019

(86) PCT No.: PCT/EP2019/066258
§ 371 (c)(1),
(2) Date: Dec. 16, 2020

(87) PCT Pub. No.: WO2019/243445
PCT Pub. Date: Dec. 26, 2019

(65) Prior Publication Data
US 2021/0117126 A1   Apr. 22, 2021

(30) Foreign Application Priority Data
Jun. 21, 2018 (DE) .......................... 102018210104.3

(51) Int. Cl.
*G06F 3/06* (2006.01)
(52) U.S. Cl.
CPC .......... *G06F 3/0655* (2013.01); *G06F 3/0604* (2013.01); *G06F 3/0673* (2013.01)
(58) Field of Classification Search
CPC .... G06F 3/0655; G06F 3/0604; G06F 3/0673; G06F 21/78; H04L 9/0866; H04L 9/14
See application file for complete search history.

(56) References Cited

U.S. PATENT DOCUMENTS 8,346,742 B1 * 1/2013 Juels ..................... G06F 21/577
  713/162
9,971,566 B2    5/2018 Cambou
(Continued)

FOREIGN PATENT DOCUMENTS

DE    102013227184 A1    7/2015

OTHER PUBLICATIONS

English language machine translation of DE 102013227184 A1, published Jul. 2, 2015; translation downloaded from Espacenet on November 30, 2020.
(Continued)

*Primary Examiner* — Zhuo H Li
(74) *Attorney, Agent, or Firm* — Kolitch Romano

(57) ABSTRACT

A method of operating a storage means, wherein for writing and storing a storage item to the storage means the storage item to be written and stored—in particular by using the concept and theory of identification—is provided, a encoding process by means of randomization is applied to the storage item to generate and to provide a randomized encoded storage item, and the randomized encoded storage item is written and stored to the storage means. At least a first randomization process is underlying the encoding process and is a randomization process dedicated and assigned to the underlying storage means. The present disclosure further refers to a unit for operating a storage means, to a storage means and to a system for processing data. By having two randomization processes underlying the encoding process, a distinction can be made between a secrecy insuring and secrecy non-ensuring randomization processes.

13 Claims, 4 Drawing Sheets

(56) References Cited

U.S. PATENT DOCUMENTS

| | | | | |
|---|---|---|---|---|
| 2013/0243187 | A1* | 9/2013 | Horstmeyer | G09C 1/00 380/28 |
| 2015/0067895 | A1 | 3/2015 | Vasyltsov et al. | |
| 2018/0115587 | A1 | 4/2018 | Roth et al. | |
| 2020/0169383 | A1* | 5/2020 | Durham | H04L 9/14 |

OTHER PUBLICATIONS

Ahlswede et al., "Common Randomness in Information Theory and Cryptography—Part I: Secret Sharing," *IEEE Transactions on Information Theory* (Jul. 1993), vol. 39, No. 4, pp. 1121-1132.

Ahlswede et al., "Common Randomness in Information Theory and Cryptography—Part II: CR Capacity," *IEEE Transactions on Information Theory* (Jan. 1998), vol. 44, No. 1, pp. 225-240.

Ahlswede et al., "Identification via Channels," *IEEE Transactions on Information Theory* (Jan. 1989), vol. 35, No. 1, pp. 15-29.

Ahlswede et al., "Identification under Random Processes," *Problems of Information Transmission* (1996), vol. 32, No. 1, 27 pages.

Ahlswede, et al., "New Directions in the Theory of Identification via Channels," *IEEE Transactions on Information Theory* (Jul. 1995), vol. 41, No. 4, pp. 1040-1050.

Boche et al., "Secure Identification for Wiretap Channels; Robustness, Super-Additivity and Continuity," *IEEE Transactions on Information Forensics and Security* (Jul. 2018), vol. 13, No. 7, pp. 1641-1655.

Boche et al., "Secure Identification Under Jamming Attacks," *2018 IEEE 19th International Workshop on Signal Processing Advances in Wireless Communications (SPAWC)* (2018), 5 pages.

Csiszár et al., "Broadcast Channels with Confidential Messages," *IEEE Transactions on Information Theory* (May 1978), vol. IT-24, No. 3, pp. 339-348.

Csiszár et al., *Information Theory: Coding Theorems for Discrete Memoryless Systems* (2011), $2^{nd}$ Edition, ISBN 978-0-521-19681-9, 522 pages.

Han et al., "New Results in the Theory of Identification via Channels," *IEEE Transactions on Information Theory* (Jan. 1992), vol. 38, No. 1, pp. 14-25.

Ignatenko et al., "Biometric Security from an Information-Theoretical Perspective," *Foundations and Trends in Communications and Information Theory* (2010), vol. 7, Nos. 2-3, 186 pages.

Lai et al., "Privacy-Security Tradeoffs in Biometric Security Systems," *Forty-Sixth Annual Allerton Conference* (Sep. 2008), pp. 268-273.

Shannon, C. E., "A Mathematical Theory of Communication," *The Bell System Technical Journal* (1948), vol. 27, 55 pages.

Verdú et al., Explicit Construction of Optimal Constant-Weight Codes for Identification via Channels, *IEEE Transactions on Information Theory* (Jan. 1993), vol. 39, No. 1, pp. 30-36.

Wyner, A. D., "The Wire-Tap Channel," *The Bell System Technical Journal* (Oct. 1975), vol. 54, No. 8, pp. 1355-1387.

\* cited by examiner

METHOD AND UNIT OF OPERATING A STORAGE MEANS, STORAGE MEANS AND SYSTEM FOR DATA PROCESSING

The present invention refers to a method and to a unit of or for operating a storage means, to a storage means as such as well as to a system for data processing.

Known storage means and methods for operating the same recite on the so-called Shannon model for message transmission and storage of channels wherein the messages and storage items can reliably be transmitted and written in an exponentially growing manner regarding the involved block length. However, the immense and fast development and increase of the amount of data to be managed in a large variety of applications calls for more efficient data storage and identification strategies also taking care of increasing secrecy issues, in particular with an identification process to be understood as a process of detecting and/or confirming the presence or absence of a storage item in a storage means, namely in the sense of the Ahlswede and Dueck introduced in 1989 [2].

It is an object underlying the present invention to provide methods and units for operating storage means, storage means as such as well as systems for data processing which are configured to more efficiently and more safely store and identify data on storage means.

The object underlying the present invention is achieved by a method of operating a storage means, by a unit for operating or controlling storage means, by a storage means, and by a system for data processing.

According to a first aspect of the present invention a method of or for operating a storage means is provided, wherein for writing and storing a storage item to the storage means (A) the storage item to be written and stored is provided, (B) an encoding process by means of randomization is applied to the storage item in order to generate and to provide a randomized encoded storage item, and (C) the randomized encoded storage item is written and stored to the storage means. At least a first randomization process is underlying the encoding process. Said first randomization process is a randomization process dedicated and assigned to the underlying storage means.

The process of providing a storage item to be written or stored may also be referred to as a process of acquiring, receiving, generating, obtaining or the like, for instance from an apparatus, a sensor, a processor or another storage means.

According to a preferred embodiment of the method according to the present invention, at least one second randomization process is underlying the encoding process.

By having two randomization processes underlying the encoding process, a distinction can be made between a secrecy insuring and secrecy non-ensuring randomization processes.

In this regard the second randomization process may be a randomization process dedicated to a particular hardware item.

In particular, the second randomization process may be based on a PUF signature of the underlying hardware item in order to ensure a high degree of secrecy. According to a preferred embodiment of the present invention, by means of the PUF signature storing a storage item can be made secure and can be protected against an eavesdropper. The PUF signature may therefore be designed having a length which is comparable small when compared to the block length of an underlying storage cell and/or assigned to a storage item to be written and/or stored in the storage means. Additionally, a secret key derived from the PUF signature may also advantageously have a negligible length.

The first randomization process may be a public randomization process.

According to an alternative and preferred embodiment of the present invention, a respective randomization process is obtained from and/or based on a discrete memoryless multiple source with respect to one or multiple underlying probability distributions and alphabets.

According to a concrete realization of the inventive method for operating a storage means, the encoding process and its underlying encoder may be configured in order to generate from the obtained storage item the encoded storage item—in particular based on a source item obtained from a discrete memoryless source—as a concatenation of (i) helper data derived by the encoder and in particular, a dedicated unit thereof, (ii) a helper message also derived by the encoder and in particular a dedicated unit thereof, (iii) an image of common randomness under a mapping characteristic for an underlying identification protocol and corresponding to the storage item, encrypted using a secret key, in particular by group composition.

Said common randomness and/or said secret key may be generated and derived by the encoder and in particular by dedicated units thereof and/or based on the storage item and the source item obtained from a public source, a PUF source and/or a general and underlying discrete memoryless multiple source on an underlying alphabet.

According to a further embodiment of the method for operating the storage means and for identifying within the storage means the presence or the absence of a given storage item, the storage item to be identified with respect to its presence or absence in the storage means may be provided, a decoding process for identification by means of randomization may be applied to the storage item in order to generate and to provide a randomized encoded storage item, the randomized encoded storage item is tried to be identified or identified within the storage means, and an identification message being representative for the presence or absence of the randomized encoded storage item in the storage means is generated and output.

Preferably, for an encoding process and its underlying encoder and/or the decoding process and its underlying decoder are configured, such that by taking into account said helper data and said helper message conveyed with the encoded storage item written to the storage means (a) together with a source item obtained from an underlying randomized source the decoder is capable of reconstructing common randomness and a the secret key as attempts or approximations of common randomness and a secret key at the site of an encoder, respectively, and equaling the same with a high degree of probability, and (b) the decoder is capable of reconstructing the image of common randomness from the encrypted image of common randomness and by using the inverse and thus decrypted form of the secret key.

For the identification process and/or for the outputting process regarding the identification message, the decoding process and its underlying decoder may advantageously be configured in order to compare reconstructions of an underlying secret key for an interested storage item and for any storage item stored in the storage means in view of the mapping being characteristic for the underlying identification protocol and in particular to output a confirming message in case that the reconstructions coincide for at least one storage item stored in the storage means and to output a non-confirming message in case that the reconstructions do not coincide for each storage item stored in the storage means.

When summing up all the circumstances given above, the present invention may additionally or alternatively be described by means of the following description:

When the storage process or system receives an item d as a message to store, an encoder $\Phi_d$ is used for the encoding process S2, which may have the following configuration:

$$\Phi_d(X^n) = (M, T_d(K) \oplus \overline{K}, \overline{M}) = U^k.$$

Thus by means of the encoder $\Phi_d$ the encoded storage item $U^k$ as a public message is—based on the source item $X^n$—constructed, written S3 to the storage means 10 and is a concatenation of (i) helper data M derived by the encoder $\Phi_d$ and a particular unit thereof—such that together with $Y^n$ from the randomized source 30, 40 the decoder $\Psi_d$ can reconstruct the common randomness K—

(ii) a helper message $\overline{M}$ also derived by the encoder $\Phi_d$ and a further particular unit thereof—such that together with $Y^n$ from the randomized source 30, 40 the decoder $\Psi_d$ can reconstruct the secret key $\overline{K}$—

(iii) an image of the common randomness K under a mapping $T_d$ characteristic for the identification protocol and corresponding to the message d, encrypted using the secret key $\overline{K}$, in particular by group composition, wherein said common randomness K and said secret key $\overline{K}$ are generated and derived by the encoder $\Phi_d$ and particular units thereof, too, and in particular based on the message d and the source item $X^n$ obtained from the public source 30 and/or PUF source 40 and in general an underlying discrete memoryless multiple source $P_{XY}$ on the alphabet $\mathcal{X} \times \mathcal{Y}$.

Such identification mappings $T_d$ are part of a protocol for identification and can—as set forth in Verdu and Wei, [15]—explicitly be constructed.

For identification of a message $\overline{d}$ one uses the decoder $\Psi_{\overline{d}}$ defined according to $$\Psi_{\overline{d}}(U^k, Y^n) = \begin{cases} 1 & \text{if } T_{\overline{d}}(\hat{K}) = U^k \big|_{\overline{K}} \oplus \left(-\hat{\overline{K}}\right) \\ 0 & \text{otherwise} \end{cases}.$$

Based on $U^k$ and $Y^n$ the decoder $\Psi_{\overline{d}}$ generate common randomness $\hat{K}$ and a secret key $\hat{\overline{K}}$ which yield as attempts or approximations of the common randomness K and the secret key $\overline{K}$ at the site of an encoder $\Phi_d$, respectively, in particular equaling the same—i.e. $K = \hat{K}$ and $\overline{K} = \hat{\overline{K}}$ are fulfilled—with high degree of probability by construction of the protocol.

The decoder $\Psi_{\overline{d}}$ reconstructs $T_d(K)$ from $T_d(K) \oplus \overline{K}$ and by using the inverse and thus decrypted form $-\overline{K}$ of the secret key $\overline{K}$.

Then the decoder $\Psi_{\overline{d}}$ compares the reconstruction of $T_d(K)$ and $T_{\overline{d}}(K)$, in case that the decoder $\Psi_{\overline{d}}$ is interested in message $\overline{d}$.

In addition, the present invention also provides a unit for operating a storage means which is configured to initiate, perform and/or control a method for operating a storage means, the method being configured according to the present invention.

The present invention also suggests the provision of a storage means which is configured to store storage items and to perform or to be used, operated and/or ruled by a method according to the present invention and which in particular comprises a unit for operating a storage means which is configured according to the present invention and/or a connection to such a unit.

Finally, a system for data processing according to the present invention is configured to be used with and/or ruled by a method according to the present invention and which in particular comprises a storage means designed according to the present invention.

These and further details, advantages and features of the present invention will be described based on embodiments of the invention and by taking reference to the accompanying figures.

In the following embodiments and the technical background of the present invention are presented in detail by taking reference to accompanying FIGS. 1 to 4. Identical or equivalent elements and elements which act identically or equivalently are denoted with the same reference signs. Not in each case of their occurrence a detailed description of the elements and components is repeated.

The depicted and described features and further properties of the invention's embodiments can arbitrarily be isolated and recombined without leaving the gist of the present invention.

The present invention refers to a method S of operating a storage means 10, wherein for writing and storing a storage item d to the storage means 10 the storage item d to be written and stored—in particular by using the concept and theory of identification—is provided S1, a encoding process S2 by means of randomization is applied to the storage item d in order to generate and to provide a randomized encoded storage item $U^k$, and the randomized encoded storage item $U^k$ is written and stored S3 to the storage means 10. At least a first randomization process S4 is underlying the encoding process S2. Said first randomization process S4 is a randomization process dedicated and assigned to the underlying storage means 10. The present invention further refers to a unit for operating a storage means 10, to a storage means 10 and to a system 1 for processing data. By having two randomization processes S4, S5 underlying the encoding process S2, a distinction can be made between a secrecy insuring and secrecy non-ensuring randomization processes.

Figure 1:
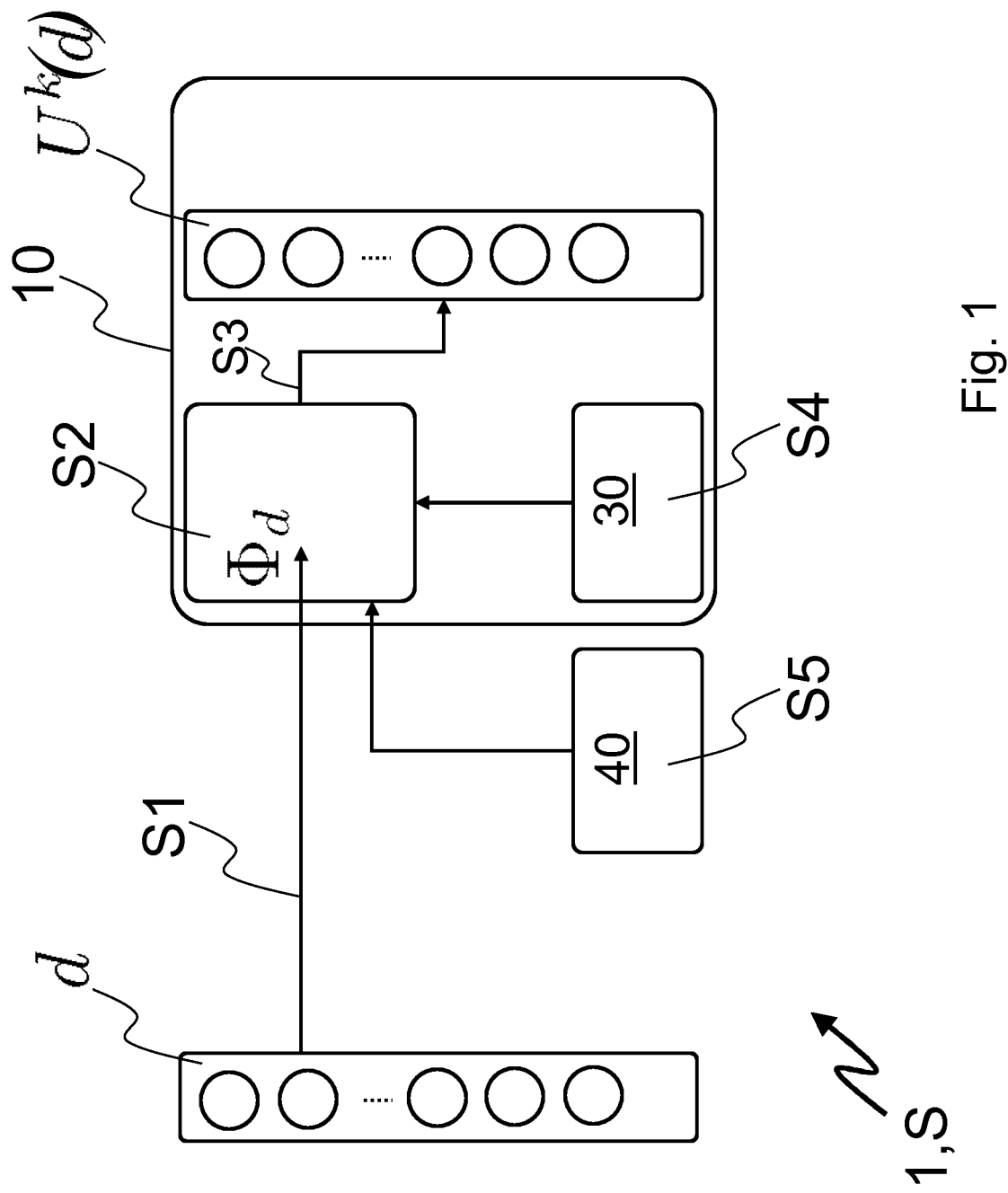
FIG. 1 is a schematic block diagram of the first embodiment of the storage system and the method for operating a storage means according to the present invention with a particular focus on the process of encoding and writing a provided storage item.

FIG. 1 is a schematic block diagram of the first embodiment of the data processing system 1 and the method S for operating a storage means 10 according to the present invention with a particular focus on the process S2 of encoding and S3 of writing a provided message or storage item.

In FIG. 1, a message or storage item d chosen from a set $\mathcal{D}$ of messages or storage items d is provided according to process S1 and applied to a process S2 of encoding the storage item d based on a combination of randomization processes S4 and S5 which are based on a public source 30 dedicated to the underlying storage means 10 and a PUF source 40 which is secret and given to an authorized user or group of authorized users, only.

The process S2 of encoding the storage item d or message is realized by an encoder $\Phi_d$ as already defined above and as further elucidated below and it yields an encoded storage item $U^k$ or message which is written by a process S3 and thereby stored into the underlying storage means 10, which is for instance realized by a public database.

The process S2 of encoding the storage item d as realized by the encoder $\Phi_d$ is thus dependent on the underlying message or storage item d to be written or stored as well as on the source inputs $X^n$ provided by the first and second randomization processes S4 and S5 and its underlying sources 30 and 40, respectively, and eventually on the further concrete nature and properties of the encoder $\Phi_d$.

Figure 2:
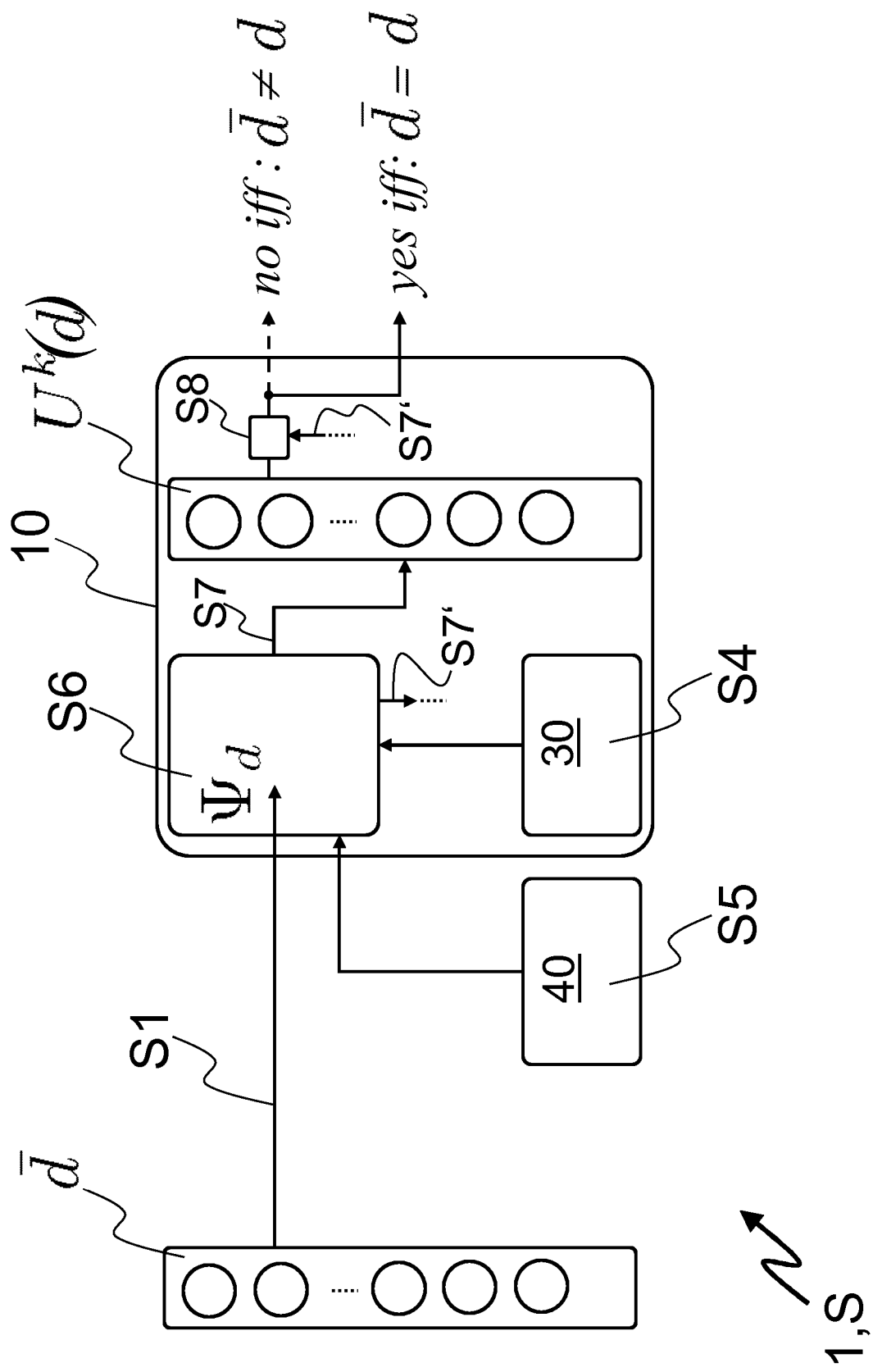
FIG. 2 is a schematic block diagram of the further embodiment of the storage system and the method for operating a storage means according to the present invention with a particular focus on the process of identifying a provided storage item with respect to its possible presence or absence in an underlying storage means.

FIG. 2 is a schematic block diagram of the further embodiment of the data processing system 1 and the method S for operating a storage means 10 according to the present invention with a particular focus on the process S7 of identifying a provided storage item $\bar{d}$ with respect to its possible presence or absence in the underlying storage means 10.

FIG. 2 elucidates in more detail the identification process S8 for a message or storage item $\bar{d}$ to be checked. First of all the storage item $\bar{d}$ to be checked regarding its presence or absence in the storage means 10 is provided S1 to a process S6 of decoding the storage item $\bar{d}$. Said process S6 of decoding is based on one or plural randomization processes S4 and S5 and respective underlying sources 30 and 40, respectively, too, and in particular on the source inputs $Y^n$ and it is realized by a decoder $\Psi_d$ as already described above and as further elucidated below.

The result of the decoding process S6 is provided to a process S7 of identification which controls—by a process S7'—a subsequent process S8 of outputting an identification message.

Said identification message provided by the process S8 of outputting yields a confirming result and for instance a "yes" in case that the investigated message $\bar{d}$ has an instance or a representation stored in the storage means 10. The process S8 of outputting an identification message yields a result confirming the absence of the investigated message $\bar{d}$ and for instance a "no" if the storage means 10 does not contain any instance or representation for the investigated message $\bar{d}$.

Figure 3:
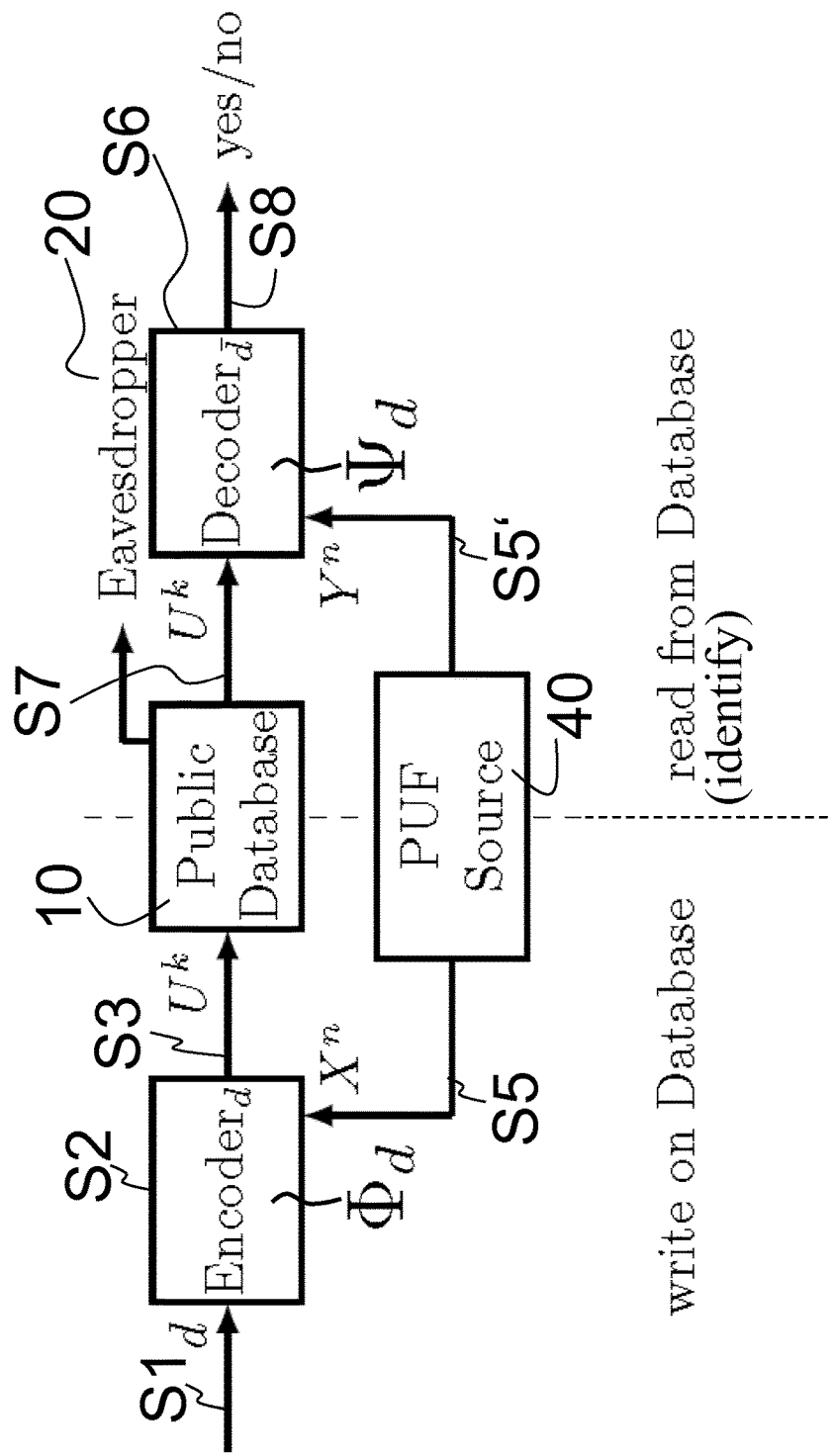
FIGS. 3 and 4 are schematic block diagrams of further embodiments of the storage system and the method of operating a storage means according to the present invention with a particular focus on a single PUF source and a PUF source combined with the public source, with all sources being formed as discrete memoryless multiple sources.
Figure 4:
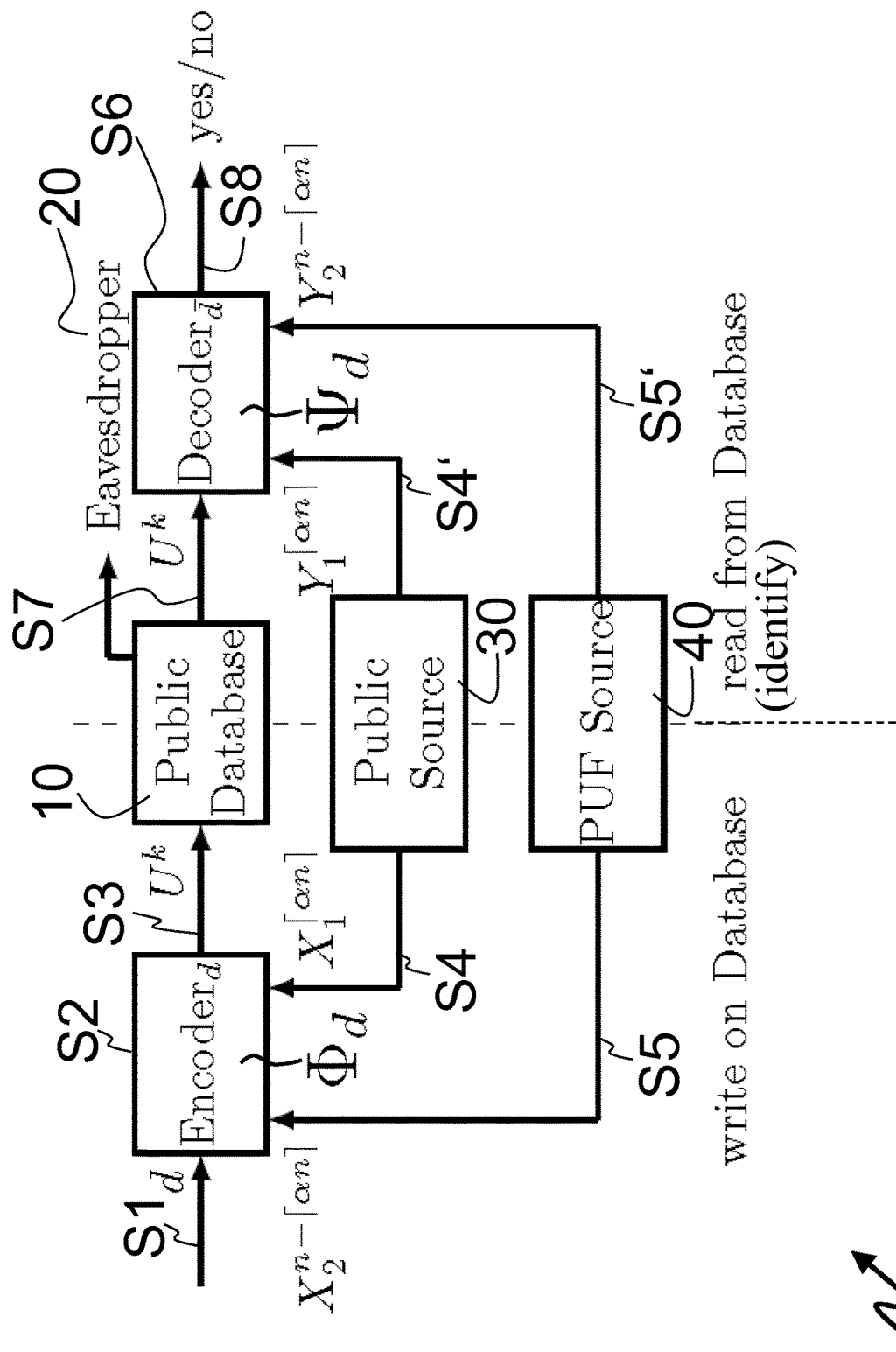

FIGS. 3 and 4 are schematic block diagrams of further embodiments of the data processing system 1 and the method S of operating a storage means 10 according to the present invention, namely with a particular focus on the provision of a single PUF source 40 and the provision of a PUF source 40 combined with the public source 30, respectively, with all sources 30, 40 being preferably formed as a discrete memoryless multiple source.

FIGS. 3 and 4 in more detail elucidate the presence of one or two discrete memoryless multiple sources 30 and 40, namely of the single PUF source 40 in FIG. 3 and dedicated to a certain external hardware item on the one hand and a public source 30 together with a PUF source 40 on the other hand in FIG. 4.

In addition, the attack of an eavesdropper 20 is elucidated in FIGS. 3 and 4 having access to the public database 10 but having no access to the PUF source 40 and its corresponding data for reconstructing an underlying secret key $\bar{K}$ as elucidated already above and as further explained below. Consequently, the eavesdropper 20 is not capable of identifying any storage item or message $\bar{d}$—detecting and/or confirming the presence or absence—which might have been written and stored to the storage means 10 making use of the data of the PUF source 40.

More details on the embodiments shown in FIGS. 3 and 4 are provided in the following sections.

Thus, these and further aspects of the present invention will also be described in detail in the following:

General Technical Formulation

In connection with the present invention, secure storage on a public database such that a stored messages can be identified is considered. It is assumed that legitimate users have access to the output of a source. This source is configured and used to generate common randomness which is used for identification. A protocol is defined for secure storage for identification such that the number of messages that can be identified grows doubly exponentially with the number of symbols read from the source. In addition, privacy leakage of the protocols used for identification is considered.

In the following, some of the aspects of identification underlying the present invention will first of all be developed by means of the concept of point-to-point transmissions and will then be used and applied in order to develop a storage for identification model on which the present invention resides:

One of the most basic models in information theory is the discrete memoryless channel or DMC for point to point transmission. This concept has been introduced by C. E. Shannon, "A mathematical theory of communication," The Bell System Technical Journal, vol. 27, no. 3, pp. 379 to 423, 1948, [1]. For this model, the Shannon capacity is defined as the supremum of all achievable transmission rates.

Informally speaking, a rate is achievable if it is possible to transmit messages at this rate, while the message sent can be reconstructed from the channel output with high probability. The number of messages that can reliably be transmitted for this notion of achievability grows exponentially with the block length. In addition to the Shannon capacity, the identification capacity may be introduced as set forth by R. Ahlswede and G. Dueck, "Identification via channels," IEEE Transactions on Information Theory, vol. 35, no. 1, pp. 15 to 29, 1989, [2].

Here again point to point transmission over a discrete memoryless channel is considered, but the definition of achievability is different.

The decoder now does not try to find out the message that has been sent from the channel output, but the decoder is interested in a distinct or single message and tries to find out whether or not this message has been, i.e. the decoder tries to identify the message. Of course the sender does not know the message the receiver is interested in.

In this scenario the probability that the receiver correctly identifies the message should be close to one. For this notion of achievability the number of messages that can reliably be identified grows doubly exponentially with the block length.

A corresponding strong converse result has been found T. S. Han and S. Verdu, "New results in the theory of identification via channels", IEEE Transactions on Information Theory, vol. 38, no. 1, pp. 14 to 25, 1992, [3].

The further development of the concept of identification used for and applied to a model of storage for identification can be further motivated by having a look at possibly use cases taken from a variety of possible applications one can think of in the context of the present invention:

Storing private information of users in public data clouds by a service provider.

Storage of data in industrial applications on databases, for example data (production data, operating data, etc.) of the industry in the operation of complex equipment with subsequent identification of errors or exceptional situations.

Storage of large amounts of data in public space (for example video surveillance) for the later identification of persons or danger situations, whereby on the one hand certain persons/events should be identified and on the other hand the privacy of other persons should be protected.

In addition, there exists a variety of execution examples, one of which being given by the following scheme:

Data is stored on a database by an authority.

When identifying persons and events, the police may access the database.

The police tries to identify the specific person k.

This task can be allowed by judges.

Then the police must use a decoder $D_k$ for person k for identification.

The police only get the answer yes or no.

Furthermore, decoder $D_k$ cannot be used to identify another person because the decoder always provides a wrong answer for another person.

In this context two different models are considered:

1. Secure storage on a public database for identification: In particular, a physical unclonable function (PUF) source is involved. A PUF source is essentially equivalent to a biometric source. We assume that the output of a biometric source uniquely characterizes a person whereas the output of a PUF source uniquely characterizes a device. This allows us to use the output of a PUF source for secure storage.

Considering the secure storage for identification process depicted in FIG. 4, the process consists of two phases.

In the first phase the system gets the message d that should be stored on the database consisting of k storage cells which can each store a value from the alphabet $\mathcal{U}$. The system reads $X^n$ from the PUF source. The system then generates $U^k$ i.e. the item to be stored for the message d—from $X^n$ using an encoder depending on d and stores $U^k$ on the public database.

In the second phase the system reads $U^k$ from the database and $Y^n$ from the PUF source. The system then uses a decoder, depending on the message d of interest, in order to decide whether $\bar{d}$ is a message stored on the underlying database, making use of $Y^n$ and $U^k$.

2. Storage for identification model with two sources: The secure storage for identification process depicted in FIG. 4 is considered. The process consists of two phases.

In the first phase the system gets the message d that should be stored on the database consisting of k storage cells which can each store a value from the alphabet u. We use a for timesharing between the PUF source and the public source. The system reads $X_1^{\lceil an \rceil}$ from the public source and $X_2^{n-\lceil an \rceil}$ from the PUF source. The system then generates $U^k$ from $(X_1^{\lceil an \rceil}, X_2^{n-\lceil an \rceil})$ using an encoder depending on d and stores $U^k$ on the public database.

In the second phase the system reads $U^k$ from the database, $Y_1^{\lceil an \rceil}$ from the public source and $Y_2^{n-\lceil an \rceil}$ from the PUF source. The system then uses a decoder, depending on the message $\bar{d}$ of interest in order to decide whether $\bar{d}$ is a message stored on the database, making use of $(Y_1^{\lceil an \rceil}, Y_2^{n-\lceil an \rceil})$ and $U^k$.

Further Technical Background

In the following, additional technical background for better understanding the present invention's gist and its differences when compared to common strategies of transmitting, writing and/or storing storage items or messages is summarized:

Storing is traditionally only performed in the Shannon picture. Here, all messages are stored so that exponentially many messages can be stored. When reading the memory contents, the question is answered which message was stored.

R. Ahlswede and I. Csiszar, "Common randomness in information theory and cryptography. ii. cr capacity", IEEE Transactions on Information Theory, vol. 44, no. 1, pp. 225 to 240, 1998, [4], defined the so called source model for generating common randomness.

Common randomness plays an important role for identification. In addition to R. Ahlswede and I. Csiszar [4], it is described by R. Ahlswede and V. B. Balakirsky, "Identification under random processes", Citeseer, 1995, [5], how to make use of the common randomness generated from the source to reliably identify a message by sending a helper message over a channel. Here the number of messages that can reliably be identified grows doubly exponentially with the number of symbols read from the source.

Security is a key requirement for modern communication and storage systems. A promising approach to realize security is physical layer security based on information theoretic security.

A basic model considered in information theoretic security is the wiretap channel as discussed by A. D. Wyner, "The wire-tap channel", Bell Labs Technical Journal, vol. 54, no. 8, pp. 1355 to 1387, 1975, [6], and I. Csiszar and J. Korner, "Broadcast channels with confidential messages", IEEE transactions on information theory, vol. 24, no. 3, pp. 339-348, 1978, [7].

In this background context and in contrast to point-to-point transmissions it is preferably assumed in the context of the present invention that an attacker or eavesdropper has access to the message sent via an additional discrete memoryless channel. In particular, the present invention is concerned with protocols which allow for reliable communication between the legitimate users while making it hard for an attacker to decode the message from the channel output he has access to. The number of messages that can reliably and securely be transmitted in this scenario grows exponentially with the block length.

According to R. Ahlswede and Z. Zhang, "New directions in the theory of identification via channels", IEEE transactions on information theory, vol. 41, no. 4, pp. 1040 to 1050, 1995, [8], identification for the wiretap channel is considered. It can be shown that the number of messages that can reliably be identified as described above in this case grows doubly exponentially with the block length. The secure identification capacity even equals the Shannon capacity of the main channel. This result can be generalized according to H. Boche and C. Deppe, "Secure identification for wiretap channels; robustness, super-additivity and continuity", IEEE Transactions on Information Forensics and Security, 2018, [9], and "Secure identification under jamming attacks", in Information Forensics and Security (WIFS), 2017 IEEE Workshop on. IEEE, 2017, pp. 1 to 6, [10], robust identification for wiretap channels is considered.

For the source model one can also consider secret key generation as indicated by R. Ahlswede and I. Csiszar, "Common randomness in information theory and cryptography—Part i: secret sharing", IEEE Transactions on Information Theory, vol. 39, no. 4, 1993, [11].

T. Ignatenko and F. M. Willems, "Biometric security from an information theoretical perspective", Now, 2012, [12], and L. Lai, S.-W. Ho, and H. V. Poor, "Privacy security trade offs in biometric security systems", in Communication, Control, and Computing, 2008, 46$^{th}$ Annual Allerton Conference on IEEE, 2008, pp. 268 to 273, [13], interpret the discrete memoryless source from the source model as a biometric source and they consider the privacy leakage of the protocols for secret key generation.

Some results concerning common randomness and secret key generation from a discrete memoryless multiple source are essential for the present invention. In the following common randomness is also referred to as CR, a secret key is also referred to SK, and a discrete memoryless multiple source is also referred to as DMMS.

In the following, particular information theoretic entities and requirements for defining the present invention will be motivated, introduced and defined:

Definition 1.

Let $n \in \mathbb{N}$ a natural number. The source model consists of a discrete memoryless multiple source (DMMS) $P_{XY}$, a (possibly randomized) encoder F: $\mathcal{X}^n \to \mathcal{K} \times \mathcal{M}$ and a (possibly randomized) decoder G: $\mathcal{Y}^n \times \mathcal{M} \to \hat{\mathcal{K}}$. Let $X^n$ and $Y^n$ be the output of the DMMS. The random variables or RVs (K,M) are generated from $X^n$ using F and the random variable $\hat{K}$ is generated from $(Y^n, M)$ using G. We call (F,G) a common randomness/secret key or CR/SK generation protocol.

In addition, the generation of common randomness or CR as introduced above is considered.

Definition 2.

Let $L \geq 0$. The item $R(L) \geq 0$ is called an achievable common randomness or CR generation rate with forward communication rate constraint L for the source model if for every $\delta > 0$ there is an $n_0 = n_0(\delta)$ such that for all $n \geq n_0$ there is a common randomness/secret key or CR/SK generation protocol such that the relations $$\frac{1}{n}\log|\mathcal{M}| \leq L + \delta \quad (1)$$

$$Pr(K = \hat{K}) \geq 1 - \delta$$

$$\frac{1}{n}H(K) \geq R - \delta$$

$$\frac{1}{n}\log|\mathcal{K}| \leq c \quad (2)$$

are fulfilled for a c>0. The corresponding CR/SK generation protocols are called common randomness or CR generation protocols with rate constraint. The supremum of all achievable CR generation rates with forward communication rate constraint L is denoted by CR capacity $C_{CR}(L)$.

Remark 1.

The last achievability requirement (2) is required in order to avoid protocols where the CR is generated deterministically while H(K) is arbitrarily large. It can be motivated to require $\hat{\mathcal{K}} = \mathcal{K}$ by arguing that, together with the bound on $\mathcal{K}$|, this implies an arbitrarily small distance between $$\frac{1}{n}$$

$H(\hat{K})$ and $$\frac{1}{n}$$

$H(K)$. So $\hat{\mathcal{K}} = \mathcal{K}$ is required.

Remark 2.

It can be seen that for each CR generation protocol with rate constraint one can find a CR generation protocol with rate constraint such that $$\sum_{k \in \mathcal{K}} \left| P_K(k) - \frac{1}{|\mathcal{K}|} \right| < \exp(-nc)$$

is valid for a c>0. That is why in the following one can always consider such protocols where the distribution of the common randomness CR is in this sense near the uniform distribution.

In Ahlswede and Csiszar 1998 $C_{CR}(L)$ has been further characterized.

Also privacy leakage for the source model is considered. This makes sense when one assumes that the DMMS, that is part of the source model, models a PUF source.

Definition 3.

A triple $(R_{CR}, R_{FC}, R_{PL})$, $R_{CR}, R_{FC}, R_{PL} \geq 0$ is called an achievable CR generation rate versus forward communication rate versus privacy leakage rate triple for the source model if for every $\delta > 0$ there is an $n_0 = n_0(\delta)$ such that for all $n \geq n_0$ there is a CR/SK generation protocol such that the relations $$Pr(K = \hat{K}) \geq 1 - \delta$$

$$\frac{1}{n}\log|\mathcal{M}| \leq R_{FC} + \delta$$

$$\frac{1}{n}I(M; X^n) \leq R_{PL} + \delta$$

$$\frac{1}{n}H(K) \geq R_{CR} - \delta$$

$$\frac{1}{n}\log|\mathcal{K}| \leq c,$$

are fulfilled for a c>0. The corresponding CR/SK generation protocols are referred to as private CR generation protocols. The set of all rate triples that are achievable using private CR generation protocols is referred to as the CR capacity region $\mathcal{R}_{CR}$.

In the context of the present invention, one is interested in $\mathcal{R}_{CR}$. In a first approach one considers private CR generation protocols with deterministic encoders and decoders (f, g).

The corresponding CR capacity region is denoted by $\mathcal{R}_{CR}{}^d$.

In Ahlswede and Csiszar 1998, deterministic CR generation protocols with rate constraint have been considered and the corresponding capacity has been characterized, which is here referred to as $C_{CR}{}^d(L)$.

They following property is valid:

Theorem 1.

It holds that $$C_{CR}^d(L) = \max_V I(V; X),$$

where the maximization runs over all random variables V such that the property V–X–Y and the property I(V;X)–I(V;Y)≤L are fulfilled. One also only has to consider random variables V obeying $|\mathcal{V}| \leq |\mathcal{X}|$.

One also considers secret key generation with perfect secrecy.

Definition 4.

The item R≥0 is called an achievable SK generation rate for the source model if for every δ>0 there is an $n_0 = n_0(\delta)$ such that for all n≥$n_0$ there is a CR/SK generation protocol such that the relations $$Pr(K = \hat{K}) \geq 1 - \delta$$

$$I(K; M) = 0$$

$$H(K) = \log|\mathcal{K}|$$

$$\frac{1}{n}\log|\mathcal{K}| \geq R - \delta.$$

are fulfilled. The corresponding CR/SK generation protocols are denoted by perfect SK generation protocols. One refers the supremum of all achievable SK generation rates as the SK capacity $C_{SK}$.

In the following result can be proven:

Theorem 2.

It holds that $C_{SK} = I(X;Y)$.

Remark 3.

In the achievability proof one can use a deterministic encoder and decoder. This implies the relation $$\frac{1}{n}\log|\mathcal{M}| \leq \log|\mathcal{X}|.$$

Limitations of the Current State of the Art

In the description of the section describing the state of the art, the storage of exponential data amount according to the Shannon picture as used today has been described. In Shannon's picture of storage, big data is actually a huge problem. The gap between the data rate generated by big data and what Moor's law provides for the development of storage media continues to diverge. For storage for later identification, this problem does not exist.

One considers the source model for generating common randomness. But in contrast to Ahlswede and Csiszar 1998 one may also consider privacy leakage of the corresponding protocols while interpreting the source as a biometric source. One can then use common randomness for identification.

Therefore, the invention's contribution is inter alia twofold in the following sentence.

The capacity for common randomness generation is characterized from a discrete memoryless source while considering privacy leakage. Protocols for identification using a discrete memoryless source are constructed. In contrast to Ahlswede and Csiszar 1998 and Ahlswede and Balakirsky 1995 it is assumed in the context of the present invention that a helper message is stored on a public database.

The protocols for identification are constructed such that they provide secrecy. So these protocols allow for secure storage for identification. The present invention may also consider the privacy leakage of these protocols.

Aspects of the Present Invention

The present invention is inter alia based on the presentation of a model for secure storage for identification and corresponding protocols.

In the following, an information theoretic model of the storage process for identification underlying the present invention is defined.

Definition 5.

Let k, n∈ℕ. The storage for identification model consists of the alphabet $\mathcal{U}$, a discrete memoryless multiple source (DMMS) $P_{XY}$ on the alphabet $X \times \mathcal{Y}$, a set of (possibly randomized) encoders $\{\Phi_d\}_{d \in \mathcal{D}}$, $\Phi_d: \mathcal{X}^n \to \mathcal{U}^k$ and a set of (possibly randomized) decoders $\{\Psi_d\}_{d \in \mathcal{D}}$, $\Psi_d: \mathcal{U}^k \times \mathcal{Y}^n \to \{0,1\}$ or all d∈$\mathcal{D}$. Let $X^n$ and $Y^n$ be the random variables (RVs) generated from $P_{XY}$. We call $(\{\Phi_d\}_{d \in \mathcal{D}}, \{\Psi_d\}_{d \in \mathcal{D}})$ a storage for identification protocol.

Assume that for each storage cell we read B>0 symbols from the PUF source. Now properties of intuitively good storage for identification protocols are discussed.

When the decoder $\Psi_d$ is interested in the message d it is reasonable to require that when d is stored on the database the decoder $\Psi_d$ decides correctly with high probability. One refers to the corresponding error as an error of the first kind. So the probability that the decoder makes an error of the first kind should be small.

When the message stored on the database is not d the decoder $\Psi_d$ should also decide correctly with high probability. We call the corresponding error an error of the second kind. So the probability that the decoder $\Psi_d$ makes an error of the second kind should be small.

One is interested in the largest possible identification rate, where one considers the number of storage cells as a resource. As usual for identification one considers the second order rate.

One considers an eavesdropper 20 who reads from the public database 10. It is assumed that the eavesdropper 20 wants to identify a specific message. The eavesdropper 20 knows the protocol used and one can even assume that the eavesdropper 20 knows the message the decoder wants to identify. It is desired that the sum of the probability that the eavesdropper makes an error of the first kind and the probability that the eavesdropper makes an error of the second kind is close to one.

The output of the PUF source uniquely characterizes a device, so one possibly wants to reuse parts of it. That is why one wants that the attacker does not have a lot of information about the PUF source output $X^n$.

This motivates the following definition of achievability for the storage for identification model.

Definition 6.

Let B>0. The tuple $(R_{ID}, R_{PL})$ $R_{ID}, R_{PL} \geq 0$ is called an achievable rate pair for the storage for identification model if for every $\delta>0$ there is a $k_0=k_0(\delta)$ such that for all $k \geq k_0$ and $n=\lceil B \cdot k \rceil$ there exists a storage for identification protocol such that for all d, $\bar{d} \in \mathcal{D}$, $\bar{d} \neq d$ the following relations $$Pr(\Psi_d(\Phi_d(X^n), Y^n) = 0) \leq \delta$$

$$Pr(\Psi_d(\Phi_{\bar{d}}(X^n), Y^n) = 1) \leq \delta$$

$$Pr(\Psi_d^E(\Phi_d(X^n)) = 0) + Pr(\Psi_d^E(\Phi_{\bar{d}}(X^n)) = 1) \geq 1 - \delta$$

$$\frac{1}{k}\log\log|\mathcal{D}| \geq R_{ID} - \delta$$

$$\frac{1}{k}I(\Phi_d(X^n); X^n) \leq R_{PL} + \delta$$

are fulfilled for all decoding strategies $\{\Psi_d^E\}_{d \in \mathcal{D}}$ of an eavesdropper 20.

The first item describes decoder errors of the first kind, the second item describes decoder errors of the second kind, the third item describes the property of the model in view of an eavesdropper 20, the fourth item describes the increase of manageable storage items in the model with its double exponential growth or increase, the fifth item describes the model's privacy leakage properties.

The corresponding storage for identification protocols are referred to as secure storage protocols. We call the set of all rate pairs that are achievable using such storage for identification protocols capacity region $\mathcal{R}_{ID}(B)$.

Remark 4.

Requirement (3)—the third item as given above in definition 6—ensures that the protocols are optimal considering security in the following sense. There are decoding strategies for the eavesdropper such that the sum of the probability that the eavesdropper makes an error of the first kind and the probability that he makes an error of the second kind is 1, while the eavesdropper does not use any of his observations from the public database.

Remark 5.

The secret model chosen from Ignatenko and Willems 2012 can be interpreted as a model for secure storage making use of a biometric source. But here the decoder reconstructs the message stored on the database instead of identifying it. Correspondingly, the set of messages that can be stored on the database grows exponentially with the block length, instead of doubly exponentially.

The following observation concerning the capacity region $\mathcal{R}$ can be derived:

Lemma 1.

Let $B>0$. $\mathcal{R}_{ID}(B)$ is a closed set.

One may use Theorem 1 obtained from Ahlswede and Csiszar 1998 in order to characterize $\mathcal{R}_{CR}^d$.

Theorem 3.

It holds that $$\mathcal{R}_{CR}^d = \bigcup_{\substack{V: \\ V-X-Y}} \{(R_{CR}, R_{FC}, R_{PL}):$$

$$0 \leq R_{CR} \leq I(V; X)$$

$$R_{FC} \geq I(V; X|Y)$$

$$R_{PL} \geq I(V; X|Y)\}$$

and one only has to consider random variables V fulfilling $|\mathcal{V}| \leq |\mathcal{X}|+1$.

Now one considers CR generation with randomized private CR generation protocols.

Theorem 4.

It holds that $$\mathcal{R}_{CR} = \bigcup_{\substack{V: \\ V-X-Y}} \{(R_{CR}, R_{FC}, R_{PL}):$$

$$0 \leq R_{CR} \leq R_{FC} + I(V; Y)$$

$$R_{FC} \geq I(V; X|Y)$$

$$R_{PL} \geq I(V; X|Y)\}$$

and one only has to consider random variables V fulfilling $|\mathcal{V}| \leq |\mathcal{X}|+1$.

Now $\mathcal{R}_{ID}(B)$ is characterized. In order to do so one makes use of results for CR and SK generation while considering the privacy leakage. Firstly consider deterministic secure storage for identification protocols ($\{\phi_d\}_{d \in \mathcal{D}}$, $\{\psi_d\}_{d \in \mathcal{D}}$). One denotes the corresponding capacity region by $\mathcal{R}_{ID}^d(B)$ and obtains the following achievability result.

Theorem 5.

It holds that $$\mathcal{R}_{ID}^d(B) \supseteq \bigcup_V \{(R_{ID}, R_{PL}): 0 \leq R_{ID} \leq I(V; X)B$$

$$R_{PL} \geq I(V; X|Y)B\},$$

wherein the union is taken over all random variables V fulfilling V–X–Y and $I(V;X|Y)B \leq \log|\mathcal{U}|$.

Now randomized secure storage for identification protocols are considered.

Theorem 6.

It holds that $$\mathcal{R}_{ID}(B) \supseteq \bigcup_{\epsilon>0}\bigcup_V \{(R_{ID}, R_{PL}): 0 \leq R_{ID} \leq \log|\mathcal{U}| + I(V; Y)B$$

$$R_{PL} \geq I(V; X|Y)B\},$$

wherein the union is taken over all random variables V such that V–X–Y and $I(V;X|Y)B \leq \log|\mathcal{U}|-\epsilon B$.

In the following, an information theoretic model of a storage process for identification with two sources 30, 40 is defined.

Definition 7.

Let k, $n \in \mathbb{N}$, $\mathcal{D}$ a finite set and $1 \geq \alpha \geq 0$. The two source storage for identification model consists of the alphabet $\mathcal{U}$, two discrete memoryless multiple sources (DMMSs) $P_{X_1 Y_1}$ and $P_{X_2 Y_2}$ on the alphabets $\mathcal{X}_1 \times \mathcal{Y}_1$ and $\mathcal{X}_2 \times \mathcal{Y}_2$ respectively, a set of (possibly randomized) encoders $\{\Phi_d\}_{d \in \mathcal{D}}$, $\Phi_d$: $\mathcal{X}_1^{\lceil \alpha n \rceil} \times \mathcal{X}_2^{n-\lceil \alpha n \rceil} \to \mathcal{U}^k$ for all $d \in \mathcal{D}$ and a set of (possibly randomized) decoders $\{\Psi_d\}_{d \in \mathcal{D}}$, $\Phi_d$: $\mathcal{U}^k \times \mathcal{Y}_1^{\lceil \alpha n \rceil} \times \mathcal{Y}_2^{n-\lceil \alpha n \rceil} \to \{0,1\}$ for all $d \in \mathcal{D}$. Let $X_1^{\lceil \alpha n \rceil}$ and $Y_1^{\lceil \alpha n \rceil}$ be the random variables (RVs) generated from $P_{X_1 Y_1}$ and let $X_2^{n-\lceil \alpha n \rceil}$ and $Y_2^{n-\lceil \alpha n \rceil}$ be the RVs generated from $P_{X_2 Y_2}$. One defines $X^n=(X_1^{\lceil \alpha n \rceil}, X_2^{n-\lceil \alpha n \rceil})$ and $Y^n=(Y_1^{\lceil \alpha n \rceil}, Y_2^{n-\lceil \alpha n \rceil})$. The entity ($\{\Phi_d\}_{d \in \mathcal{D}}$, $\{\Psi_d\}_{d \in \mathcal{D}}$, $\alpha$) is referred to as a two source storage for identification protocol. Now properties that storage for identification protocols should have so that they are considered good storage for identification protocols intuitively are discussed in the following.

It is reasonable to require a small probability that an error of the first kind occurs when using the decoder $\Psi_d$ for the message or storage item d to find out whether or not the message or storage item d is stored on the database 10. One also desires that an error of the second kind occurs with a small probability. One considers an eavesdropper 20 who reads from the public database 10 and who wants to find out whether or not message d is stored on the database 10. The eavesdropper 20 also has access to the public source 30. It is desired that the sum of the probability that the eavesdropper 20 makes an error of the first kind and the probability that the eavesdropper 20 makes an error of the second kind is close to 1.

One is interested in the largest possible identification rate, where one considers the number of storage cells as a resource. One considers a fixed ratio B of the number of symbols read from the two sources and the number of storage cells in the database 10.

The output of the PUF source uniquely characterizes a device, so one possibly wants to reuse parts of it. That is why one desires that the attacker 20 does not have a lot of information about the PUF source output $X_2^{n-\lceil\alpha n\rceil}$.

This motivates the following definition of achievability for the storage for identification model.

Definition 8.

Let B>0. We call the tuple $(R_{ID}, R_{PL})$ $R_{ID}, R_{PL} \geq 0$ an achievable rate pair for the storage for identification model if for every $\delta>0$ there is a $k_0=k_0(\delta)$ such that for all $k \geq k_0$ and $n=\lceil B \cdot k \rceil$ there exists a storage for identification protocol such that for all d, $\bar{d} \in \mathcal{D}$, $d \neq \bar{d}$ the following relations $$Pr(\Psi_d(\Phi_d(X^n), Y^n) = 0) \leq \delta$$
$$Pr(\Psi_d(\Phi_{\bar{d}}(X^n), Y^n) = 1) \leq \delta$$
$$Pr(\Psi_d^E(\Phi_d(X^n), X_1^{\lceil\alpha n\rceil}, Y_1^{\lceil\alpha n\rceil}) = 0) +$$
$$Pr(\Psi_d^E(\Phi_{\bar{d}}(X^n), X_1^{\lceil\alpha n\rceil}, Y_1^{\lceil\alpha n\rceil}) = 1) \geq 1 - \delta$$
$$\frac{1}{k}\log|\mathcal{D}| \geq R_{ID} - \delta$$
$$\frac{1}{k}I(\Phi_d(X^n) X_1^{\lceil\alpha n\rceil}, Y_1^{\lceil\alpha n\rceil}; X_2^{n-\lceil\alpha n\rceil}) \leq R_{PL} + \delta$$

are fulfilled for all decoder strategies $\{\Psi_d^E\}_{d \in \mathcal{D}}$ of an eavesdropper 20. The set of all rate pairs that are achievable using such storage for identification protocols is referred to as the capacity region $\mathcal{R}_{ID,2}(B)$.

The considerations on CR generation may be extended by adding a second source.

Definition 9.

Let $n \in \mathbb{N}$ and let $1 \geq \alpha \geq 0$. A two source model consists of two discrete memoryless multiple sources (DMMSs) $P_{X_1 Y_1}$ and $P_{X_2 Y_2}$ on the alphabets $\mathcal{X}_1 \times \mathcal{Y}_1$ and $\mathcal{X}_2 \times \mathcal{Y}_2$ respectively, a (possibly randomized) encoder $F: \mathcal{X}^n \to \mathcal{K} \times \mathcal{M}$ and a (possibly randomized) decoder $G: \mathcal{Y}^n \times \mathcal{M} \to \mathcal{K}$ :Let $X_1^{\lceil\alpha n\rceil}$ and $Y_1^{\lceil\alpha n\rceil}$ be the random variables (RVs) generated from $P_{X_1 Y_1}$ and $X_2^{n-\lceil\alpha n\rceil}$ and let $Y_2^{n-\lceil\alpha n\rceil}$ be the RVs generated from $P_{X_2 Y_2}$. One defines $X^n = (X_1^{\lceil\alpha n\rceil}, X_2^{n-\lceil\alpha n\rceil})$ and $Y^n = (Y_1^{\lceil\alpha n\rceil}, Y_2^{n-\lceil\alpha n\rceil})$. The RVs (K,M) are generated from $X^n$ using F and the RV $\hat{K}$ generated from $(Y^n, M)$ using G. One can call $(F, G, \alpha)$ a two source CR generation protocol.

Inspired by the discussion on the achievability for the source model and the storage for identification model one can define achievability for the two source model.

Definition 10.

The triple $(R_{CR}, R_{FC}, R_{PL})$, $R_{CR}, R_{FC}, R_{PL} \geq 0$ is referred to as an achievable CR generation rate versus forward communication rate versus privacy leakage rate pair for the two source model if for every $\delta>0$ there is an $n_0 = n_0(\delta)$ such that for all $n \geq n_0$ there is a CR generation protocol such that the relations $$Pr(K = \hat{K}) \geq 1 - \delta$$
$$\frac{1}{n}\log|\mathcal{M}| \leq R_{FC}$$
$$\frac{1}{n}I(M, X_1^{\lceil\alpha n\rceil}, Y_1^{\lceil\alpha n\rceil}; X_2^{n-\lceil\alpha n\rceil}) \leq R_{PL} + \delta$$
$$\frac{1}{n}H(K) \geq R_{CR} - \delta$$
$$\sum_{k \in \mathcal{K}}\left|P_K(k) - \frac{1}{|\mathcal{K}|}\right| < \exp(-nc),$$

are fulfilled for a c>0. The set of all rate triples that are achievable using such CR generation protocols is referred to as the CR capacity region $\mathcal{R}_{CR}'$.

In addition to the foregoing description of the present invention, for an additional disclosure explicit reference is taken to graphic representation of FIGS. 1 to 4.

LIST OF REFERENCES

[1] C. E. Shannon, "A mathematical theory of communication," The Bell System Technical Journal, vol. 27, no. 3, pp. 379 to 423, 1948

[2] R. Ahlswede and G. Dueck, "Identification via channels," IEEE Transactions on Information Theory, vol. 35, no. 1, pp. 15 to 29, 1989

[3] T. S. Han and S. Verdu, "New results in the theory of identification via channels", IEEE Transactions on Information Theory, vol. 38, no. 1, pp. 14 to 25, 1992

[4] R. Ahlswede and I. Csiszar [4], it is described by R. Ahlswede and V. B. Balakirsky, "Identification under random processes", Citeseer, 1995

[5] R. Ahlswede and V. B. Balakirsky, "Identification under random processes", Citeseer, 1995

[6] A. D. Wyner, "The wire-tap channel", Bell Labs Technical Journal, vol. 54, no. 8, pp. 1355 to 1387, 1975

[7] I. Csiszar and J. Korner, "Broadcast channels with confidential messages", IEEE transactions on information theory, vol. 24, no. 3, pp. 339-348, 1978

[8] R. Ahlswede and Z. Zhang, "New directions in the theory of identification via channels", IEEE transactions on information theory, vol. 41, no. 4, pp. 1040 to 1050, 1995

[9] H. Boche and C. Deppe, "Secure identification for wiretap channels; robustness, super-additivity and continuity", IEEE Transactions on Information Forensics and Security, 2018

[10] H. Boche and C. Deppe, "Secure identification under jamming attacks", in Information Forensics and Security (WIFS), 2017 IEEE Workshop on. IEEE, 2017, pp. 1 to 68

[11] R. Ahlswede and I. Csiszar, "Common randomness in information theory and cryptography—Part i: secret sharing", IEEE Transactions on Information Theory, vol. 39, no. 4, 1993
[12] T. Ignatenko and F. M. Willems, "Biometric security from an information theoretical perspective", Now, 2012
[13] L. Lai, S.-W. Ho, and H. V. Poor, "Privacy security trade offs in biometric security systems", in Communication, Control, and Computing, 2008, 46th Annual Allerton Conference on IEEE, 2008, pp. 268 to 273
[14] I. Csiszar and J. Korner, "Information theory: coding theorems for discrete memoryless systems", Cambridge University Press, 2011
[15] S. Verdu and V. K. Wei, "Explicit Construction of Optimal Constant-Weight Codes for Identification Via Channels", IEEE Transactions on Information Theory, Vol. 39, No. 1, 1993

LIST OF REFERENCE SIGNS AND ABBREVIATIONS 1 system, storage system
10 storage means, public data base
20 eavesdropper
30 public source
40 PUF source
B (incoming) storage item, bit sequence
B' (randomized encoded) storage item
CR common randomness
$\mathcal{D}$ set of messages
d message, storage item (from the set $\mathcal{D}$ of messages) written/stored in the storage means 10
$\bar{d}$ message, storage item (from the set $\mathcal{D}$ of messages) to be identified
DMC discrete memoryless channel
DMMS discrete memoryless multiple source
K common randomness
$\bar{K}$ secret key
M helper data
$\bar{M}$ helper message
PUF physical unclonable function
$P_{XY}$ discrete memoryless multiple source
$P_{X_1Y_1}$ discrete memoryless multiple source
$P_{X_2Y_2}$ discrete memoryless multiple source
S operating method
S1 providing storage item
S2 encoding of storage item (based on randomization process)
S3 writing encoded storage item
S4 $1^{st}$ randomization process (encoder site)
S4' $1^{st}$ randomization process (decoder site)
S5 $2^{nd}$ randomization process (encoder site)
S5' $2^{nd}$ randomization process (decoder site)
S6 decoding storage item for identification (based on randomization process)
S7 identification process
S7' control process (applied to process of outputting identification message S8)
S8 outputting identification message
SK secret key
$T_d$ mapping being characteristic for an identification protocol
$U^k$ encoded storage item/message (in particular written/stored to storage means 10)
$\mathcal{U}$ alphabet
$X^n$ source item, random variable
$X_1^{\lceil\alpha n\rceil}$ source item, random variable
$X_2^{n-\lceil\alpha n\rceil}$ source item, random variable
$\mathcal{X}$ alphabet
$\mathcal{X}\times\mathcal{Y}$ alphabet
$\mathcal{X}_1\times\mathcal{Y}_1$ alphabet
$\mathcal{X}_2\times\mathcal{Y}_2$ alphabet
$Y^n$ source item, random variable
$Y_1^{\lceil\alpha n\rceil}$ source item, random variable
$Y_2^{n-\lceil\alpha n\rceil}$ source item, random variable
$\mathcal{Y}$ alphabet
$\Phi_d$ encoder
$\Psi_d$ decoder

The invention claimed is:

1. A method (S) of operating a storage means (10), the method comprising:
  writing and storing a storage item (d) to the storage means (10), wherein the writing and storing comprises:
    providing (S1) the storage item (d) to be written and stored,
    applying, to the storage item (d), an encoding process (S2) by means of randomization in order to generate and to provide a randomized encoded storage item ($U^k$), and
    writing and storing (S3) the randomized encoded storage item ($U^k$) to the storage means (10),
  wherein at least a first randomization process (S4) is underlying the encoding process (S2), and
  wherein said first randomization process (S4) is a randomization process dedicated and assigned to the underlying storage means (10),
  wherein the encoding process (S2) and an underlying encoder ($\Phi_d$) for the encoding process (S2) are configured in order to generate from the provided storage item (d) the encoded storage item ($U^k$) based on a source item ($X^n$) obtained from a discrete memoryless source (30, 40) as a concatenation of
    (i) helper data (M) derived by a dedicated unit of the encoder ($\Phi_d$),
    (ii) a helper message ($\bar{M}$) also derived by a dedicated unit of the encoder ($\Phi_d$), and
    (iii) an image of common randomness (K) under a mapping ($T_d$) characteristic for an underlying identification protocol and corresponding to the storage item (d), encrypted using a secret key ($\bar{K}$), in particular by group composition, and
  wherein said common randomness (K) and said secret key ($\bar{K}$) are generated and derived by dedicated units of the encoder ($\Phi_d$) and/or based on the storage item (d) and the source item ($X^n$) obtained from a public source (30), a Physical Unclonable Function (PUF) source (40) and/or a general and underlying discrete memoryless multiple source ($P_{xy}$) on an underlying alphabet (X×Y).

2. The method (S) according to claim 1, wherein at least one second randomization process (S5) is underlying the encoding process (S2).

3. The method (S) according to claim 2, wherein a respective randomization process of the first randomization process (S4) and the second randomization process (S5) is obtained from and/or based on a discrete memoryless multiple source with respect to one or multiple underlying probability distributions and alphabets.

4. The method (S) according to claim 2, wherein the second randomization process (S5) is a randomization process dedicated to a particular hardware item.

5. The method (S) according to claim 4, wherein the second randomization process (S5) is based on a physical unclonable function (PUF) signature of the underlying hardware item.

6. The method (S) according to claim 1, wherein the first randomization process (S4) is a public randomization process.

7. The method (S) according to claim 1, wherein the method further comprises identifying within the storage means (10) the presence or absence of a storage item ($\bar{d}$), wherein the identifying includes providing (S1) the storage item ($\bar{d}$) to be identified with respect to its presence or absence in the storage means (10), applying a decoding process (S6) for identification by means of randomization to the storage item ($\bar{d}$) in order to generate and to provide a randomized encoded storage item ($U^{k_1}$), checking the randomized encoded storage item ($U^{k_1}$) to be identified (S7) within the storage means (10), and generating and/or outputting (S8) an identification message being representative for the presence or absence of the randomized encoded storage item ($U^{k_1}$) in the storage means (10).

8. The method (S) according to claim 7, wherein the encoding process (S2) and its underlying encoder ($\Phi_d$) and/or the decoding process (S6) and an underlying decoder ($\Psi_d$) are configured, such that by taking into account said helper data (M) and said helper message ($\overline{M}$) conveyed with the encoded storage item ($U^{k_1}$) written to the storage means (10)

(a) together with a source item ($Y^n$) obtained from an underlying randomized source (30, 40) the decoder ($\Psi_d$) is capable of reconstructing common randomness ($\hat{K}$) and a secret key ($\tilde{K}$) as attempts or approximations of common randomness (K) and the secret key ($\overline{K}$) at the site of an encoder ($\Phi_d$) respectively, and equaling the same with a high degree of probability, and (b) the decoder ($\Psi_d$) is capable of reconstructing the image ($T_d(K)$) of common randomness (K) from an encrypted image ($T_d(K) \oplus \overline{K}$) of common randomness (K) and by using the inverse and thus decrypted form ($-\tilde{K}$) of the secret key ($\overline{K}$).

9. The method (S) according to claim 8, wherein for the identification process (S7) and/or for the outputting process (S8) regarding the identification message, the decoding process (S6) and its underlying decoder ($\Psi_d$) are configured in order to compare reconstructions ($T_d(K)$, $T_{\bar{d}}(K)$) of an underlying secret key (K) for an interested storage item ($\bar{d}$) and for any storage item (d) stored in the storage means (10) in view of the mapping ($T_d$) being characteristic for the underlying identification protocol and in particular to output a confirming message in case that the reconstructions coincide for at least one storage item (d) stored in the storage means (10) and to output a non-confirming message in case that the reconstructions do not coincide for each storage item (d) stored in the storage means (10).

10. A unit for operating a storage means (10), which is configured to initiate, perform and/or control a method according to claim 1.

11. A storage means (10), which is configured to store storage items and comprises the unit according to claim 10 and/or a connection to the unit according to claim 10.

12. A system (1) for data processing, which comprises a storage means (10) according to claim 11.

13. A method (S) of operating a storage means (10), the method comprising:

identifying within the storage means (10) the presence or absence of a storage item ($\bar{d}$), wherein the identifying comprises:

providing (S1) the storage item ($\bar{d}$) to be identified with respect to its presence or absence in the storage means (10), applying to the storage item ($\bar{d}$) a decoding process (S6) for identification by means of randomization $\bar{d}$ in order to generate and to provide a randomized encoded storage item ($U^{k_1}$), checking the randomized encoded storage item ($U^{k_1}$) to be identified (S7) within the storage means (10), and generating and/or outputting (S8) an identification message being representative for the presence or absence of the randomized encoded storage item ($U^{k_1}$) in the storage means (10), and wherein the decoding process (S6) and an underlying decoder ($\Psi_d$) are configured, such that by taking into account helper data (M) and a helper message ($\overline{M}$) conveyed with the encoded storage item ($U^{k_1}$) written to the storage means (10)

(a) together with a source item ($Y^n$) obtained from an underlying randomized source (30, 40), the decoder ($\Psi_d$) is capable of reconstructing common randomness ($\hat{K}$) and a secret key ($\tilde{K}$) as attempts or approximations of common randomness (K) and the secret key ($\overline{K}$) at the site of an encoder ($\Phi_d$), respectively, and equaling the same with a high degree of probability, and (b) the decoder ($\Psi_d$) is capable of reconstructing an image ($T_d(K)$) of common randomness (K) from an encrypted image ($T_d(K) \oplus \overline{K}$) of common randomness (K) and by using the inverse and thus decrypted form ($-\tilde{K}$) of the secret key ($\overline{K}$).

* * * * *

UNITED STATES PATENT AND TRADEMARK OFFICE
CERTIFICATE OF CORRECTION

PATENT NO. : 11,556,273 B2
APPLICATION NO. : 17/252971
DATED : January 17, 2023
INVENTOR(S) : Sebastian Baur et al.

It is certified that error appears in the above-identified patent and that said Letters Patent is hereby corrected as shown below:

On the Title Page

Item "(73) Assignee," please delete "Technische Universität," and insert --Technische Universität München,-- therefor.

In the Claims

Claim 1, Column 18, Line 41, please delete "($\acute{M}$)" and insert --(M)-- therefor.

Claim 1, Column 18, Line 48, please delete "($\acute{K}$)" and insert --(K)-- therefor.

Claim 1, Column 18, Line 49, please delete "($\acute{K}$)" and insert --(K)-- therefor.

Claim 1, Column 18, Line 54, please delete "($P_{xy}$)" and insert --($P_{XY}$)-- therefor.

Claim 13, Column 20, Line 24, please delete "randomization $\bar{d}$ in" and insert --randomization in-- therefor.

Signed and Sealed this
Twenty-eighth Day of March, 2023

Katherine Kelly Vidal
*Director of the United States Patent and Trademark Office*